United States Patent [19]

Scott, deceased

[11] 3,823,637

[45] July 16, 1974

[54] PROGRAMMED AUDIO-VISUAL TEACHING AID

[76] Inventor: Kenneth N. Scott, deceased, Toyah, Tex. Joe Weldon Scott, administrator

[22] Filed: Jan. 19, 1973

[21] Appl. No.: 325,187

[52] U.S. Cl. .................................. 84/470, 84/477
[51] Int. Cl. ........................................... G09b 15/00
[58] Field of Search ............. 84/470, 478, 484, 477; 35/5, 6, 9 A

[56] References Cited
UNITED STATES PATENTS

| | | | |
|---|---|---|---|
| 3,456,546 | 7/1969 | Welsh et al. | 84/478 |
| 3,538,622 | 11/1970 | Zadig | 35/9 A |
| 3,546,791 | 12/1970 | Koos et al. | 35/9 B |
| 3,595,122 | 7/1971 | Brediceanu | 84/484 |
| 3,724,097 | 4/1973 | Schmoyer | 84/478 X |

Primary Examiner—Lawrence R. Franklin
Attorney, Agent, or Firm—Berman, Bishoff & Platt

[57] ABSTRACT

An audio-visual educational apparatus consisting of a master transmitting station and a number of receiving stations operated by students. In a typical embodiment for teaching music the visual portion of the lesson material, consisting of musical notation, is carried on a film strip provided with appropriately spaced programming clear spots through which light is transmitted onto photocells in the apparatus at the master station. The receiving stations have piano keyboards wherein the keys operate switches which are connected in respective counter circuits for scoring students' responses as to correct time, note and rhythm. The audio lesson material is provided by a magnetic tape player, which also programs the film strip projector and which furnishes audio instructions. An audible beat is provided as an aid to playing on time. The counter circuits are electrically interlocked with the photocells to provide scoring in accordance with proper actuation of the piano key switches. Provision is made for responses to questions of the multiple-choice type. The counters are provided with print-out mechanisms operating in unison with the projector motor. The system may be employed with the lesson material and the programming information transmitted by television.

21 Claims, 8 Drawing Figures

RECEIVING STATION

PROGRAMMED AUDIO-VISUAL TEACHING AID

This invention relates to audio-visual educational apparatus, and more particularly to an educational system wherein lesson material is transmitted by a master station and the material is received by individual receiving stations operated by students.

A main object of the invention is to provide an improved audio-visual educational apparatus of the type including a master transmitting station and a number of receiving stations individually operated by students who respond to the information and actuate key switches intended to correspond with the transmitted information, means being provided for scoring the student's responses, the apparatus involving relatively simple components, being easy to operate, and providing accurate information as to the correctness of the student's responses.

A further object of the invention is to provide a novel and improved audio visual system for presenting lesson material to students and for obtaining responses from the students indicating their comprehension or lack of comprehension of the lesson material, the system involving relatively simple apparatus, providing a means for furnishing audible instructions to the students with respect to visual lesson material being presented, and providing means for obtaining responses from the students to specific visual lesson material and for accurately and reliably scoring these responses on digital or other suitable types of response indicators.

A still further object of the invention is to provide an improved audio-visual educational apparatus employing a master station and a number of receiving stations operated by individual students, the lesson material being provided visually, for example, on film strip, and the audio portion of the lesson material and instructions relative thereto being furnished by a conventional sound reproducing apparatus, for example, a magnetic tape play-back machine, the visual portion of the lesson material being furnished along with programming clear spots on the film strip which are detected by photocell means at the master station and which establishes suitable circuitry for responding to action by the students to indicate the students' comprehension of the visual material being furnished and operating in accordance therewith to provide numerical scoring of the students' responses, the apparatus being suitable for teaching many subjects, and being particularly suitable for teaching music.

A still further object of the invention is to provide an improved audio-visual educational apparatus particularly suitable for teaching musical notation and testing the comprehension of students with regard to such notation, the system involving a master transmitting station and a number of receiving stations operated by individual students, the receiving stations being provided with piano keyboards whereby the students may operate keys corresponding to musical notes shown in the visual presentation provided by the system, and the apparatus including means for scoring the responses of the students to the presented musical notation, as to accuracy with regard to rhythm, note and time, the apparatus also including means for providing an audible beat for each musical count, and the apparatus being further provided with means to present visual material requiring a response of the multiple-choice type by the students with appropriate means for scoring such responses.

Further objects and advantages of the invention will become apparent from the following description and claims, and from the accompanying drawings, wherein:

FIG. 1b is an electrical wiring diagram showing typical circuitry of one of the receiving stations associated with the master transmitting station of FIG. 1a.

FIG. 2 is an enlarged fragmentary view of a projected portion of a visual presentation film strip as it appears on the screen of the projection device used in the system shown in FIG. 1a.

FIG. 4 is a diagrammatic perspective rear view of the ground glass projection screen and a portion of the projector employed at the master station associated with the wiring diagram of FIG. 1a.

FIG. 5 is a diagrammatic perspective view showing portions of the closed circuit television system which may be employed for transmitting the visual information of the projection screen of FIG. 4 to monitors provided at the respective remote receiving stations to enable the students to view the projected visual material.

Referring to the drawings, FIGS. 1a, 1b, 2, 3, 4 and 5 relate to a typical embodiment of the present invention adapted for the presentation of educational material in the form of musical notation. For example, the material to be presented comprises typical musical notation illustrated in FIG. 2 at 61 which is carried on a film strip, whose projection is shown at 62, which is adapted to move leftwardly, as viewed in FIG. 2, namely, in the direction of the arrow shown adjacent the continuous musical staff 61. In accordance with the present invention, a projection box 63 is provided at the master station, said box having a translucent projection screen 64 onto which the material carried by the film strip 62 is projected, namely, the musical notation comprising the continuously moving staff 61, and this material, as projected on the screen 64, is viewed by a conventional television camera 65 arranged generally in the manner illustrated in FIG. 5, and the video information received by the camera 65 is, in turn, transmitted by suitable wiring to television monitor receivers 66 provided at the respective student stations. The visual lesson material presented on the monitors 66 is synchronized, in a manner presently to be described, with audio information transmitted to the student stations from a magnetic tape recording and playback machine 67 provided at the master station.

The projection box 63 is provided with a conventional projector in which the film strip 62 can be inserted and the projector includes a driving motor 68 and a projection lens assembly 69 suitably arranged to project the image of the lesson material carried by strip 62, as well as suitably coded programming information carried by the film strip and presently to be described toward the translucent screen 64.

In the typical arrangement herein illustrated for presenting musical lesson material, the film strip 62 is carried through the projection mechanism at constant speed. However, this constant speed may be varied by the provision of a manually adjustable speed-control rheostat $R_1$ connected in the energizing circuit for the projector motor 68, as shown in FIG. 1a.

The programming information carried on the film strip 62 consists of light-transmitting areas on the film, which is otherwise substantially opaque, the light-transmitting areas being in the form of clear spots suitably located on the film strip to provide various functions, presently to be described, as the film strip is moved through the projector. The light-transmitting clear spots cooperate with respective stationary photocells positioned at a side margin of screen 64 to receive light projected through the clear spots and to respond thereto in a manner presently to be described.

Figure 1A:
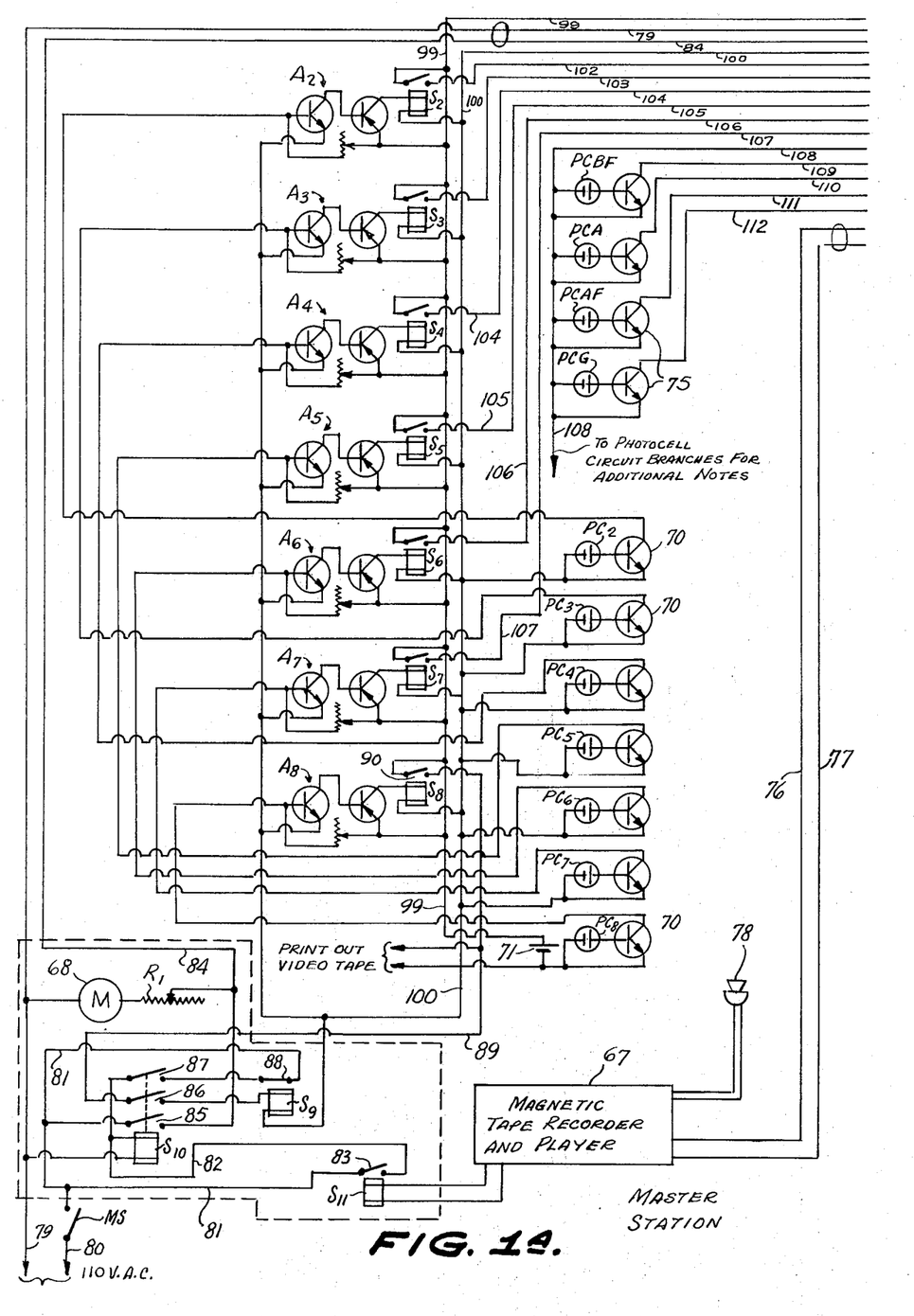
FIG. 1a is a wiring diagram of typical electrical circuitry employed at the master transmitting station of an audio-visual educational apparatus constructed in accordance with the present invention.

In the typical arrangement, the lesson material may be on 35 millimeter film and silicon photocells would be employed as the photocell elements, shown at $PC_2$ to $PC_8$ in FIG. 1a, these photocells being most sensitive in the red portion of the spectrum. The lesson material on the film may be blue or green on a black background. The programming spots would comprise clear spots, such as the round spots 72 or the longitudinally elongated spots 73 shown in FIG. 2, spaced along the film strip in accordance with the desired program, as will be subsequently described.

Figure 2:
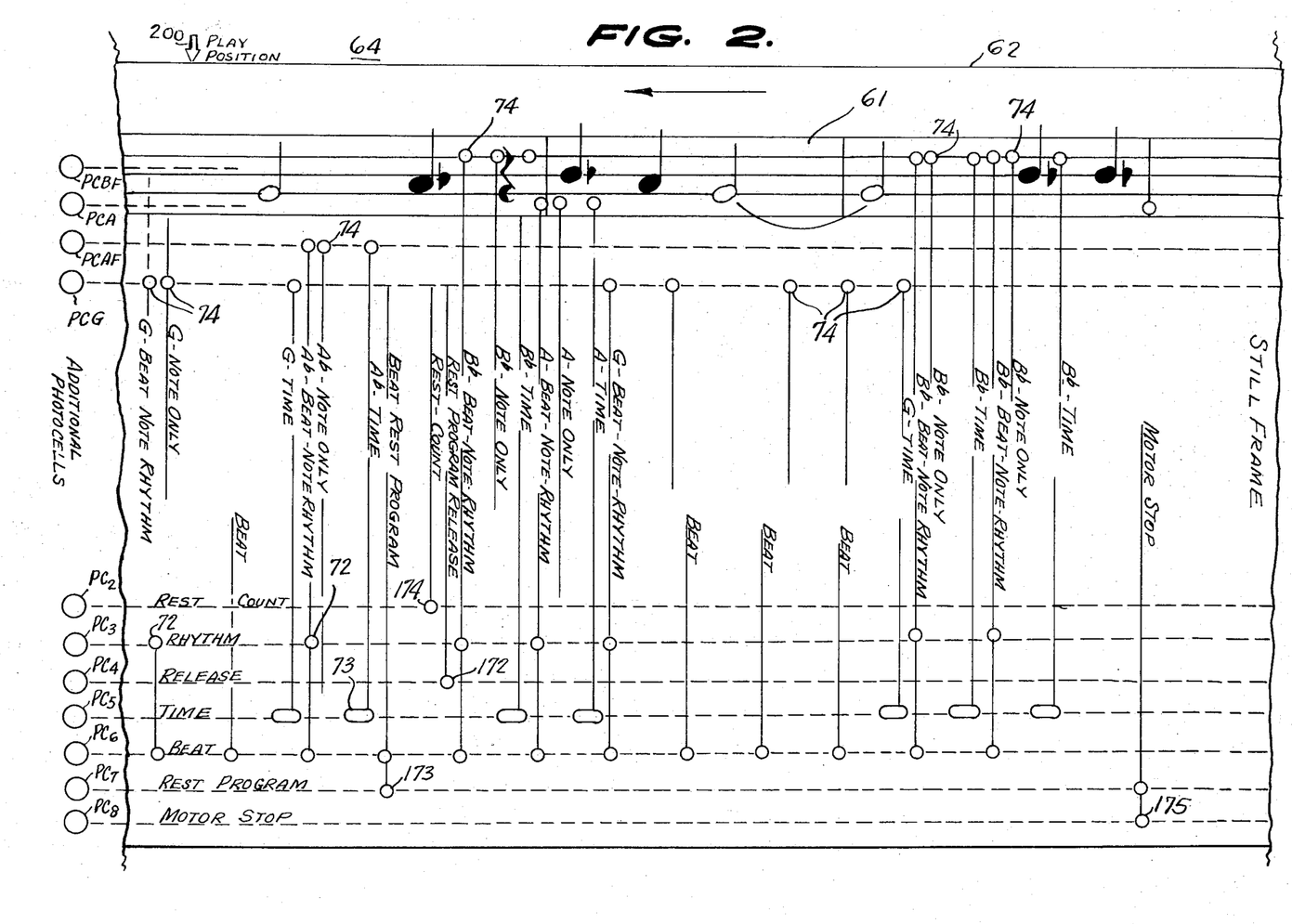
Figures 4, 5:
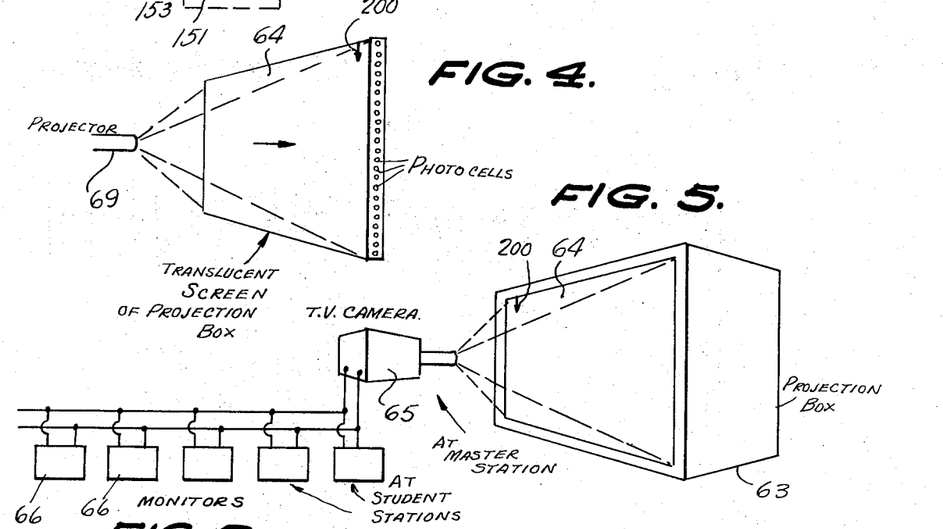

As shown in FIG. 1a, the apparatus provided at the master station includes relays $S_2$ to $S_8$ operated by respective transistorized amplifiers $A_2$ to $A_8$, which are in turn operated by the photoelectric amplifiers 70 driven by the respective photocells $PC_2$ to $PC_8$ mounted in the projection box 63 at the right side margin of screen 64 in the manner diagrammatically illustrated in FIG. 4. In association with these relays $S_2$ to $S_8$, a direct current power source is provided at the master station, for example, a battery 71, the negative terminal of the battery being connected to a wire 100 and the positive terminal of the battery 71 being connected to a wire 99, as shown. The relays $S_2$ to $S_8$ are of the normally open, single pole type, and the relays $S_2$ to $S_7$ have their normally open contacts connected between wire 99 and respective wires 102 to 107, leading to the remote student stations. Respective clear spots 74 for the various musical notes included in the lesson material are provided on the film strip, and correspondingly positioned photocells are provided at the side margin of screen 64 to respond to transmitted spots of light corresponding to these musical notes. FIG. 1a shows four such photocells designated at PCBF, PCA, PCAF and PCG respectively. It will be understood that additional photocells will be provided for the necessary additional notes. The note spots 74 are arranged in respective different longitudinal rows of the film strip and the respective note-detecting photocells are arranged in corresponding positions at the side margin of the screen to respond to these spots when illuminated, in the manner illustrated in FIG. 2. Thus, FIG. 2 shows the respective photocells PCBF, PCA, PCAF and PCG arranged in alignment with the clear spots 74 corresponding respectively to the musical notes $B^b$, A, A$^b$, and G.

The photocells associated with the aforesaid musical notes are drivingly connected to transistor amplifiers 75, the photocells being connected in circuit between a wire 108 and the bases of respective amplifier transistors 75, the collectors of said transistors being respectively connected to output wires 109, 110, 111, and 112, as shown in FIG. 1a. As above-mentioned, additional photocells, transistor amplifiers 75 and corresponding output wires are provided for the additional musical notes.

The audio output wires from the magnetic tape reproducing machine 67 are shown at 76 and 77, and these wires lead to conventional sound reproducing equipment at the various receiving stations.

The magnetic tape recording and reproducing machine is shown as being provided with an input microphone 78. The information on the audio tape used with the machine 67 is prerecorded and is preferably furnished with the associated film as a set to the user on a rental or purchase basis. The microphone 78 is intended to be used in the same manner as in a conventional intercom system for communicating with the students as a group or individually. It is shown incorporated with the tape player amplifier and speakers for economy.

As shown in FIG. 1a, the master transmitting station is energized from alternating current supply line wires 79 and 80, and the supply wire 80 is connected to a wire 81 through a master control switch MS. A relay $S_{10}$ has one terminal of its energizing winding connected to the line wire 79 and the other terminal of said winding connected to a wire 82, which is in turn connected to the wire 81 through the normally open contacts 83 of a relay $S_{11}$. The relay $S_{11}$ is controlled by the magnetic tape reproducing machine 67 and is operated in a conventional manner from control pulses provided on the magnetic tape carrying the audio information which is transmitted along with the visually presented lesson material. Thus, the visual presentation is turned on by suitable pulses provided on the accompanying audio tape.

As will be seen in FIG. 1a, the relay $S_{10}$ has its winding connected across the wires 79 and 82, so that the relay becomes energized responsive to the energization of the relay $S_{11}$, which is in turn controlled by the pulses provided on the audio tape contained in the magnetic tape reproducing machine 67.

One terminal of the projector motor 68 is connected to the wire 79. The other terminal of said motor is connected through the speed-controlling rheostat $R_1$ to a wire 84, which is in turn connected to the wire 81 through a first set of normally open contacts 85 of the relay $S_{10}$, said relay having two additional sets of such normally open contacts 86 and 87. Thus, with the main switch MS closed, energization of the relay $S_{11}$ causes its contacts 83 to close, thereby energizing the relay $S_{10}$ by connecting its winding across the wires 81 and 79. This causes the contacts 85 to close which thereby energizes the projector motor 68 by connecting the wire 84 to the wire 81.

The wire 81 is connected through the relay contacts 87 and normally closed contacts 88 of a relay $S_9$ to the wire 82, so that the relay $S_{10}$ is held energized as long as relay $S_9$ remains deenergized.

It will be noted that the relay $S_9$ has one terminal of its winding connected to the wire 100 and the other terminal of its winding connected through the contacts 86 of relay $S_{10}$ to a wire 89, which is in turn connected through the normal open contacts 90 of the relay $S_8$ to the wire 99. The relay $S_8$ is controlled by the photocell $PC_8$ through its associated transistor amplifiers 70 and $A_8$ which act to energize the relay $S_8$ from the battery 71 responsive to the reception of light by the photocell $PC_8$, as will be presently described. The closing of the contacts 90 of the relay $S_8$ connects the winding of the relay $S_9$ to the battery 71 through the wires 100, 89, and 99 and the contacts 86 of relay $S_{10}$, thereby causing the relay contacts 88 to open and thus open the holding circuit for the relay $S_{10}$.

The energizing circuit for the relay $S_8$ includes the output transistor of the amplifier $A_8$ which is rendered conductive responsive to the conduction of a transistor 70 resulting from the reception of a light beam by the photocell $PC_8$. The remaining amplifiers $A_2$ to $A_7$ control their associated relays $S_2$ to $S_7$ in response to light beams received by their associated photocells $PC_2$ to $PC_7$.

Figure 1B:
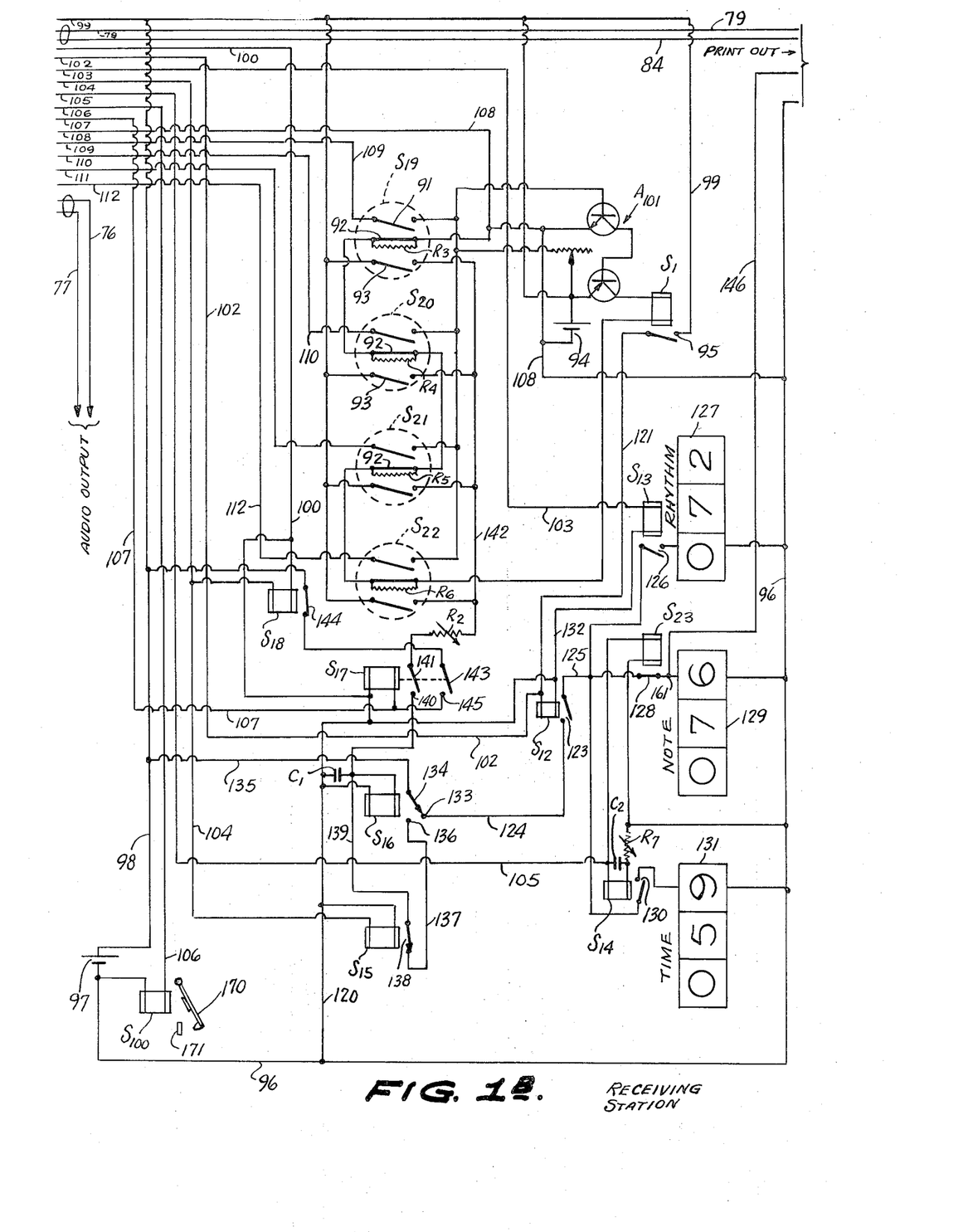

FIG. 1b shows the electrical circuit of a typical student station connected to the master station illustrated in FIG. 1a. The student station is provided with a piano keyboard wherein the respective keys control switch assemblies designated generally at $S_{19}$ to $S_{22}$, and corresponding to the musical notes $B^b$, A, $A^b$ and G previously mentioned. Additional assemblies similar to these are provided for the other musical notation elements which may be included in the lesson material carried on the film strip 62.

Each of the key-operated switch assemblies $S_{19}$ to $S_{22}$, and the others similar thereto, not shown, comprises a three-pole single throw manual switch assembly including the three-poles 91, 92 and 93, the poles 91 and 93 normally disengaging their associated stationary contacts and the pole 92 normally engaging its associated stationary contact. Thus, the poles 91 and 93 are normally in open positions and the poles 92 are normally in closed positions. Respective resistors, shown at $R_3$ to $R_6$, are connected across the poles 92 and their respective associated stationary contacts, for a purpose presently to be described.

It will be seen from FIG. 1b that when the pole 91 of switch $S_{19}$ is closed, the wire 109 can be connected to the base of the input transistor of a transistorized amplifier $A_{101}$. The output transistor of this amplifier is connected in circuit with one terminal of a relay $S_1$, being connected between said relay terminal and the positive terminal of a battery 94. The negative terminal of the battery 94 is connected to the wire 108. The remaining terminal of the winding of the relay $S_1$ is connected to the wire 108 through the series-connected resistors $R_3$ to $R_6$, these resistors being normally shunted by their switch poles 92. With the amplifier $A_{101}$ turned on by the closure of one of the poles 91, as will be presently described, the battery 94 is connected to the winding of the relay $S_1$ through a series circuit including one of the resistors $R_3$ to $R_6$ in the typical embodiment illustrated in FIG. 1b, the remaining switch poles 92 engaging their stationary contacts. If more than one key are operated simultaneously, this places one or more additional resistors from the group comprising the resistors $R_3$ to $R_6$ into the series circuit, reducing the current to a value insufficient to energize the relay $S_1$. Thus, the relay $S_1$ can be energized only if only one of the resistors $R_3$ to $R_6$ is included in its energizing circuit.

The relay $S_1$ has normally open contacts 95 connected between wire 99 and one terminal of the winding of a relay $S_{12}$. The other terminal of the winding of relay $S_{12}$ is connected to a wire 96, which is in turn connected to the negative terminal of a battery 97 whose positive terminal is connected by a wire 98 to the wire 99. Thus, when the relay $S_1$ is energized, it closes its contacts 95 which thereby energizes the relay $S_{12}$ by a circuit comprising battery 97, wire 96, a wire 120, the winding of the relay $S_{12}$, a wire 121, the closed contacts 95 of relay $S_1$, the wire 99, and the wire 98 leading back to the positive terminal of battery 97.

The relay $S_{12}$ has the normally open contacts 123 connected between wires 124 and 125. Wire 125 is connected through the normally open contacts 126 of a relay $S_{13}$ to one terminal of a conventional digital counter 127, the other terminal of said counter 127 being connected to the wire 96. The counter 127 is employed as a "rhythm" scoring device.

Wire 125 is likewise connected through the normally closed contacts 128 of a relay $S_{23}$ to one terminal of a conventional digital counter 129 whose other terminal is likewise connected to wire 96. The counter 129 is employed as a "note" scoring device.

Wire 125 is similarly connected through the normally open contacts 130 of a relay $S_{14}$ to one terminal of a conventional digital counter 131 whose other terminal is also connected to wire 96. The counter 131 is employed as a "time" scoring device.

The wire 103 is connected to one terminal of the winding of the relay $S_{13}$, and the other terminal of said winding is connected by a wire 132 and the wire 120 to the wire 96. Thus, the counter 127 can be actuated responsive to the energization of the relay $S_{13}$ if the contacts 123 of the relay $S_{12}$ are simultaneously closed, since such closure connects the wire 125 to the wire 124, which is normally connected through a stationary contact 133 and the pole 134 of a single pole two-position relay $S_{16}$ to a wire 135 which is in turn connected to the wire 98.

With the relay $S_{23}$ in its normal deenergization condition, the closure of the contacts 123, with relay $S_{16}$ in its normal condition, actuates the "note" counter 129. The closure of the contacts 123, with the relay $S_{16}$ in its normal condition, can also actuate the "time" counter 131 if the relay $S_{14}$ is simultaneously energized to cause its contacts 130 to close, namely, if the wire 105 is connected to the wire 99, in other words, if the relay $S_5$ is energized by the reception of light by photocell $PC_5$.

A sounding solenoid $S_{100}$ has one terminal of its winding connected to the wire 96, and has its other terminal connected to the wire 106. Thus, the sounding solenoid $S_{100}$ is actuated by the closure of the contacts of the relay $S_6$, namely, is response to a light spot received by the photocell $PC_6$. As seen in FIG. 1a, such a reception of light by the photocell $PC_6$ connects the wire 106 to the wire 99 and thus connects the sounding solenoid $S_{100}$ to the battery 97 through the wire 98.

The remaining stationary contact 136 of the relay $S_{16}$ is connected by a wire 137 and the normally closed contacts 138 of a relay $S_{15}$ to a wire 139. The wire 139 is connected to the stationary contact 140 of a relay $S_{17}$, which when energized closes its pole 141 to engage said stationary contact. Pole 141 is connected through a variable resistance $R_2$ to a wire 142 which is connected to the stationary contacts associated with the poles 93 of the key-operated switches $S_{19}$ to $S_{22}$. The remaining pole 143 of relay $S_{17}$ is connected through the normally closed contacts 144 of a relay $S_{18}$ to the wire 98. The stationary contact 145 associated with pole 143 is connected to the wire 107. One terminal of the winding of the relay $S_{17}$ is connected to said wire 107 and the other terminal of said winding is connected to the wire 100, as well as to the wire 120.

One terminal of the winding of the relay $S_{16}$ is connected to the wire 139 and the other terminal of said winding is connected to the wire 120. The winding of the relay $S_{15}$ is connected between the wires 104 and 120, as shown. The winding of the relay $S_{18}$ is connected between the wires 104 and 100.

Figure 3:
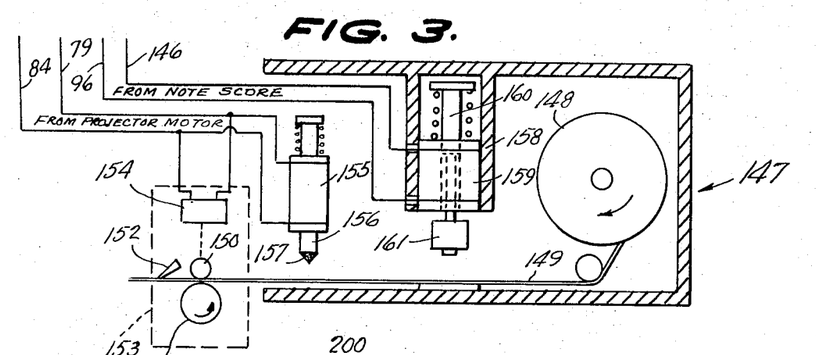
FIG. 3 is a schematic cross-sectional view showing the general arrangement of print-out mechanism employed with the scoring device forming part of the apparatus associated with the circuit shown in FIG. 1b.

Referring to FIG. 3, it will be seen that the apparatus includes a score print-out mechanism for each student station, said mechanism being generally designated at 147. Each print-out mechanism 147 comprises a suitable supporting reel 148 for a paper tape 149 which passes between a pressure driving roller 150 and an idler roller 151 past a transverse tear bar 152 suitably mounted in a housing 153. The driving roller 150 is driven by a motor 154 which is connected to the wires 79 and 84, and is thus energized simultaneously with the projection motor 68. A marker solenoid 155 is connected in parallel with the motor 154 and is provided with a plunger 156 having an inked felt marker 157 arranged to produce a mark on the paper tape 149 when the solenoid 155 is energized. Thus, the plunger 156 marks the tape 149 simultaneously with the energization of the projection motor 68, indicating the transmission of the lesson material to the student, since the tape 149 moves concurrently with the movement of the film strip 62 carrying the visual lesson material.

The print-out mechanism 147 also includes a solenoid housing 158 in which is mounted a conventional consecutive number stamping solenoid 159 having a plunger 160 provided at its bottom end with a consecutive number stamp 161. The plunger 160 is arranged so as to be offset from the plunger 156 of the marking solenoid 155 and is longitudinally spaced therefrom, with respect to the paper strip 149, so that the consecutive number indication provided by the number stamp 161 is transversely spaced from the marking provided by the inked felt marker 157 on the paper strip.

One terminal of the number stamping solenoid 159 is connected to the wire 96. The other terminal of stamping solenoid 159 is connected by a wire 146 to the same input terminal 161 to which the wire 125 is connected through the normally closed contacts 128 of relay $S_{23}$. Thus, the number stamping solenoid 159 is connected in parallel with the note counter 129 and becomes energized simultaneously therewith.

As will be readily apparent, the note counter 129 and the print-out mechanism 147 may be combined in a conventional manner whereby the note counter 129 may comprise a conventional digital counter having conventional print-out means. Similarly, the "rhythm" counter 127 and the "time" counter 131 may likewise comprise conventional digital counters having print-out means.

As previously mentioned, programming clear spots 72, 73 and 74 are provided on the film strip 62 to provide light spots in alignment with the transversely arranged detection photocells, the clear spots providing light beams impinging on said photocells in accordance with the prearranged program, in accordance with the musical notation provided on the film strip 62. As shown in FIG. 1b, the relay $S_{14}$ is provided with a variable resistor $R_7$ in its energizing circuit and a shunting capacitor $C_2$ connected in parallel with its winding. The relay $S_{16}$ likewise has a shunting capacitor $C_1$ connected across its winding. These capacitors are employed to provide a suitable amount of damping of the action of said relays.

The current sources 71, 94 and 97 are shown, for convenience, as batteries. However, it will be readily understood that these current sources may comprise suitable constant voltage power supplies operated from the 110 volt alternating current line and controlled by the main switch MS so that when the main switch is opened, these power supplies are deenergized.

In using the apparatus, with the main switch off, the film is placed in the projector and the associated magnetic tape is placed in the tape reproducing apparatus 67. The main switch MS is then closed. The relay $S_{10}$ is deenergized at this time and the projector is likewise deenergized. The magnetic tape apparatus 67 is then turned on and a pulse from the control track of the magnetic tape actuates relay $S_{11}$, causing it to close its contacts 83 and thereby energize the relay $S_{10}$, which latches closed by establishing the above-described holding circuit including the contacts 87 and the closed contacts 88 of the relay $S_9$.

The film leader is opaque, and thus, none of the photocells are activated until the first note is in "play" position as indicated in FIG. 2. Slightly over one measure of music should be visible on the screen at a time.

In the typical example illustrated in FIG. 2, the first note is "G" and at this time, the beam through clear spot 74 is presented over the photocell PCG, causing a signal to be presented at the key switch $S_{22}$ via the wire 112. At the same time, the beam through a clear spot 72 is presented over the photocell $PC_3$ which causes a signal to be furnished through the amplifier $A_3$ and thereby causes the relay $S_3$ to close its contacts. This energizes the relay $S_{13}$ by connecting its winding to the battery 71, namely, by connecting said winding to the wires 99 and 100 through the wire 103. However, no current is available at this time to energize the "rhythm" counter 127 because although the contacts 126 are closed, the contacts 123 of the relay $S_{12}$ are open. At this time, a "beat" light spot (See FIG. 2) is also presented over the photocell $PC_6$, and for the short duration of this presentation, the sounding solenoid $S_{100}$ is energized from the battery 97 by the closure of the contacts of the relay $S_6$, which connects the wire 106 to the wire 99. This swings the sounding armature 170 against its anvil 171 and provides an audible beat.

If the "G" key (switch $S_{22}$) is now depressed, it moves its poles 91 and 93 into contact closing position and moves its pole 92 into contact-opening position. This connects the base of the input transistor of amplifier $A_{101}$ to the wire 112 and thus to the wire 108 through the amplifier 75 associated with the photocell PCG, which causes the relay $S_1$ to become energized and closes contacts 95. This energizes the relay $S_{12}$, causing it to close its contact 123, thereby actuating the "rhythm" counter 127, the counter 127 being thus connected to the battery 97 through the wires 98, 135, the contacts 134–133, the wire 124, the contacts 123, the wire 125, the contacts 126 and the wire 96. A count is thus registered on the "rhythm" score. The "note" counter 129 is also actuated at this time since it is connected to the battery 97 by the wire 98, the wire 135, the contacts 134–133, the wire 124, the contacts 123, the wire 125, the closed contacts 128 and the wire 96. Therefore, a count is also registered on the "note" score.

When the "G" key (switch $S_{22}$) is actuated, the opening of its pole 92 places resistor $R_6$ in series with the winding of the relay $S_1$, providing the correct operating current for this winding. If more than one key is depressed, as above-described, excessive resistance is introduced into the circuit of the winding of the relay $S_1$ and said relay will not close. This prevents the operation of several keys simultaneously in order to obtain the correct key.

If the "G" key is depressed slightly late, a count is registered on the "note" counter 129, since two clear spots 74 are provided on the film strip to provide two light spots arranged to move in sequence over the photocell PCG, as shown at the left end portion of the projected film strip 62 in FIG. 2. However, the "rhythm" light spot 72 has moved out of registry with the photocell $PC_3$ at the moment that the second light spot 74 moves over the photocell PCG so that a "rhythm" count is not obtained under these conditions.

If the note is held for the correct length of time, corresponding to its notation, an elongated light spot 73 moves over the photocell $PC_5$ and actuates the amplifier $A_5$, causing the contacts of the relay $S_5$ to close and causing the relay $S_{14}$ to become energized through the wire 105 by connecting the winding of the relay $S_{14}$ to the battery 97 through the wires 105, 99, 98 and 96. The closure of the contacts 130 of the relay $S_{14}$ actuates the "time" counter 131 by connecting the counter 131 to the battery 97 through the wires 98, 135, contacts 134–133, wire 124, contacts 123, wire 125, contacts 130 and wire 96. The capacitor $C_2$ introduces a slight delayed action so that relay $S_{23}$ opens before relay $S_{14}$ closes.

The operations for the succeeding musical notations on the film strip 62 are the same as above-described, except for the key involved. For example, FIG. 2 shows the next musical note as consisting of $A^b$, in which case, in making a correct choice, the student will actuate the key switch $S_{21}$.

In the typical musical notation shown on the film strip 62 in FIG. 2, the next item consists of a quarter rest. A "rest" program light spot 173 from film strip 62 passes over the photocell $PC_7$ prior to the arrival of the rest note at the "play" position, and the photocell $PC_7$ causes relay $S_7$ to close its contact and energize the wire 107, thereby energizing the relay $S_{17}$, which is latched by the closure of its holding contacts 143–145 and an energizing circuit including the normally closed contacts 144 of the relay $S_{18}$. If no key is depressed during the rest interval, a light spot 174 provided by film strip 62 passes over photocell $PC_2$, which energizes the relay $S_2$ and thus energizes the wire 102, causing the relay $S_{12}$ to be energized and closes contacts 123, causing a count to be registered on the "note" score counter 129. If a note key is depressed during the rest interval, then the relay $S_{16}$ is energized through a pole 93 of the depressed note key switch. This causes the relay pole 134 to engage stationary contact 136 and disengage from stationary contact 133. The relay $S_{16}$ latches in this position through the contacts 138 of the relay $S_{15}$. Thus, even though the relay $S_{12}$ is energized at the end of the rest interval, no count is registered, because pole 134 is disengaged from the contact 133.

A light spot 172 from the film strip 62 now passes over the photocell $PC_4$, causing the relay $S_4$ to be energized and to close its contacts, thereby energizing the wire 104, which energizes the relay $S_{15}$ and causes it to open its contacts 138, thereby releasing the relay $S_{16}$. At the same time, the relay $S_{18}$ is energized, opening its contacts 144, and thereby releasing the relay $S_{17}$.

Operation for the next two notes, namely, "$B^b$" and "A," is the same as previously described for the notes "G" and "$A^b$." Following these is a tied note, and operation is the same as for the other notes except that if the corresponding key is held depressed, a note score equal to the value of the tied notes is registered by the provision of a plurality of light spots 74 arranged to provide corresponding actuation of the associated note photocell, in this case, photocell PCG.

Operation for the next two notes, namely, two "$B^b$" quarter notes, is the same as previously described. The next lesson material presented on the film strip 62 is the typical case herein illustrated comprises a still frame used for instruction or testing. When this frame is presented on the screens at the student stations, a light spot 175 from the film strip passes over the photocell $PC_8$, energizing the relay $S_8$, causing it to close its contacts and thereby energize the relay $S_9$, causing the contacts 88 of this relay to open and thereby release the relay $S_{10}$, which stops the projector motor 68. During all of the time immediately preceding, audio instructions may be conveyed by means of the audio tape carried on the tape reproducing machine 67.

If no answer is required to the material presented in the still frame, the controlling track on the magnetic tape provides a pulse to energize the relay $S_{11}$ to move the next frame into viewing position after allowing the proper time for visual display and for audio instruction from the tape sound track. Thus, movement of the frames is controlled by the tape control track and the frames are stopped by the programmed light spots 175 provided by the film strip 62. If the lesson material provided on the still frame thus presented requires an answer, a light spot 173 is provided at the appropriate location by the film strip 62 so that it passes over the photocell $PC_7$ at the time that this still frame is presented, causing relay $S_7$ to be energized and to thus energize wire 107, causing relay $S_{17}$ to be latched on. Some of the notes on the student's keyboard are numbered, for example, from "1" to "6," and a correct answer requires that the key carrying the correct number be depressed. A light spot 74 is provided by the film strip 62, corresponding to the correct numbered key. Therefore, if the correct key is depressed, the relay $S_1$ is energized, closing its contacts 95 and energizing the relay $S_{12}$. As in the previously described mode of operation, the selected key switch $S_{19}$, $S_{20}$, $S_{21}$, or $S_{22}$, or others included in the system, must correspond to the photocell PCBF, PCA, etc., which is illuminated.

Assuming, for example, that the correct answer requires the actuation of the key switch $S_{20}$, corresponding to the illumination of the photocell PCA, the actuation of the key switch $S_{20}$ coincident with the illumination of the photocell PCA causes the energization of the relay $S_1$ as above-described, and the similar energization of the relay $S_{12}$. The relay $S_{17}$ is also energized by the provision of a clear spot to provide illumination of the photocell $PC_7$, so that the contacts 141–140 are closed. Thus, the energizing circuit to the relay $S_{16}$ is also closed through the contacts 141–140 of relay $S_{17}$ and the pole 93 of the actuated key switch $S_{20}$, but the relay $S_{16}$ has sufficient delay action (provided by the resistor $R_2$ and the capacitor $C_1$) to allow for a count to be registered on the "note" counter 129. If a wrong answer key is depressed, then the relay $S_1$ does not become energized and the relay $S_{16}$ latches with its pole 134 engaging its contact 136, allowing no further choice of answers.

After an appropriate time is allowed for answering, the control track on the magnetic tape starts the next frame and a light spot 172 provided by the film strip 62 causes the photocell $PC_4$ to be illuminated, energizing the wire 104 and thus energizing the relay $S_{15}$, which opens its contacts 138 and releases the relay $S_{16}$ and the relay $S_{17}$.

Figure 6:
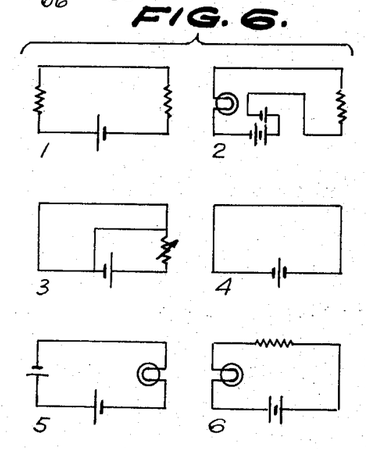
FIG. 6 shows a typical visual presentation requiring a response of the multiple-choice type, being illustrative of the type of multiple-choice questions which may be employed visually in an audio-visual educational system according to the present invention.

FIG. 6 illustrates visual material in the form of six alternative simple circuit diagrams which define an example of a multiple-choice type of question required to be answered by a student. The typical question may be to recognize a proper electrical circuit and to identify the correct circuit by operating the numbered key switch corresponding to the correct circuit. Thus, in FIG. 6, "1" represents the correct circuit and the student, if answering correctly, will actuate the key switch carrying the same number. FIG. 6 merely illustrates a typical presentation of visual lesson material presenting information of the multiple-choice type, requiring the student to select the correct numerical answer.

As above-mentioned, the allotted time for answering is provided by the program on the control track of the magnetic tape carrying the audio instructions and advanced by the tape reproducing apparatus 67. After the allotted time, the control pulse from the magnetic tape actuates the relay $S_{11}$ and thereby energizes the projector motor 68 and advances the film strip 62. A light spot 172 then actuates the photocell $PC_4$ in the manner above-described, releasing the relays $S_{15}$ and $S_{16}$.

The "play" position requiring a response from the student is designated by an index marker 200 provided on the master viewing screen 64, as shown in FIG. 5. Said master viewing screen, including said index marker 200, is reproduced on the student monitors 66, along with the visual lesson material projected onto the screen by the film projector.

Figure 7:
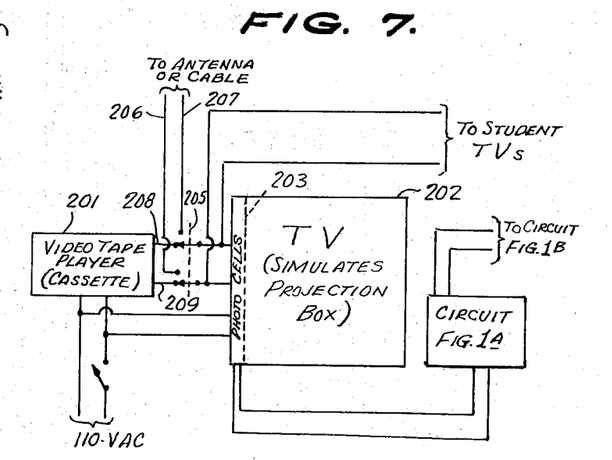
FIG. 7 is a schematic block diagram illustrating an arrangement wherein the educational subject matter may be provided either at the master station or from a remote television broadcasting station, the system employing electronic information transmitting and receiving apparatus rather than optical projection apparatus, in accordance with the present invention.

As shown in FIG. 7, the lesson material may be furnished by conventional television apparatus, either from a remote location or by employing a video tape player 201. The master station is thus provided with a suitable television receiver 202 provided with the suitably spaced photocells 203 arranged along the screen of the receiver in the same manner as the photocells previously described are arranged along the film strip 62 so as to respond to the light spots forming the program for the master station circuit of FIG. 1a and the student station circuits typically illustrated in FIG. 1b. A two-pole, double-throw selector switch 205 is arranged so as to connect the television receiver 202 either to the conductors 206, 207 leading to either a television antenna or to a conventional coaxial cable by means of which the lesson material is transmitted to the apparatus, or to the output terminals 208, 209 of the video tape player 201 which furnishes the lesson material. Presentation via television broadcast or by the use of a video tape player would require only the conventional single audio channel, because the programmed stop signals can be initially recorded on the video tape. The presentation can also be achieved by the use of 35 mm film, but the film would have to be run at the regular motion picture speed, and the bulkiness and high cost of the required amount of film would seem to make the use of video tape, running at a slower speed, with associated programming, more practical.

The arrangement of FIG. 7 obviously eliminates the need for the television camera 65 of FIG. 5.

While certain specific embodiments of an improved audio visual educational system has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. An educational system comprising a master station and at least one remote student station, a screen at the master station, means to provide a longitudinally unidirectionally moving display of visual lesson material comprising musical notation on a continuous musical staff, including programming spots at transversely differing locations corresponding to the transversely differing locations of musical notations on the continuous musical staff, means to transmit said visual material to the student station and to present it for viewing, register means at the student station, student-actuated means at the student station, said student-actuated means including notation-selecting switch means for selectively identifying the viewed musical notations, photo-sensitive means adjacent said screen aligned longitudinally with the notation-associated programming spots and positioned to receive said programming spots as the display of lesson material moves on said screen, circuit means operatively interconnecting said photo-sensitive means, student-actuated means and register means, and means to operate said register means responsive to operation of said student-actuated notation-selecting switch means only when a predetermined programming spot corresponding to a correct notation identification is received by said photo-sensitive means, and wherein said student-actuated means includes a plurality of switch devices, each switch device being associated with a specific respective notation-associated programming spot on said screen, relay means operatively connected to said register means, and means to operate said relay means when the switch device associated with a particular spot is actuated simultaneously with the reception of said last-named spot by said photo-sensitive means, wherein said photo-sensitive means comprises respective photo cells, each being located to receive on of said programming spots, each being operatively connected to said relay means through the switch devices, and wherein the switch devices include respective impedances and circuit means to connect each impedance in series with said relay means responsive to the actuation of its associated switch device, the impedances being of sufficient magnitude to prevent operation of said relay means if more than one impedance is connected in series with said relay means.

2. The educational system of claim 1, and means to provide an audible beat at the student station concurrently with the movement of the visual musical notation lesson material.

3. The educational system of claim 1, and wherein said register means comprises a plurality of registers, each representing a particular feature of the student's response, and means simultaneously operating one or more of said registers in accordance with the timing of the operation of said student-actuated means when said predetermined spot is received by said photo-sensitive means.

4. The educational system of claim 3, and means simultaneously operating two of said registers when operation of said student-actuated means notation selecting switch is maintained for a predetermined period of time.

5. The educational system of claim 1 and means to provide a further operation of said register means if a correctly actuated switch device is held actuated for a predetermined period of time corresponding to a musical time value shown by the associated musical notation.

6. The educational system of claim 1 and means to provide only a partial operation of said register means if a correctly actuated switch device is actuated slightly late with respect to the presentation of an associated musical notation element of lesson material at the student station.

7. The educational system of claim 1, and means to transmit audio material to the student station simultaneously with the display of visual musical notation lesson material.

8. The educational system of claim 7, and wherein at least the visual musical notation lesson material is furnished by a source of video signals.

9. The educational system of claim 8, and wherein the source of video signals is a television broadcast station.

10. The educational system of claim 8, and wherein the source of video signals is a video tape player.

11. The educational system of claim 7, and wherein the means to transmit audio material includes means to control the movement of the display of visual musical notation lesson material and programming spots.

12. The educational system of claim 11, and wherein the means to provide said unidirectional moving musical notation display comprises a projector containing a film strip carrying the visual lesson material and programming spots, said projector being operatively positioned to project the visual lesson material and programming spots onto the screen and having driving motor means to unidirectionally move said film strip.

13. The educational system of claim 12, and wherein the means to transmit audio material comprises a magnetic tape sound reproducing apparatus and circuit means connecting the output of said reproducing apparatus to the student station, the reproducing apparatus being provided with magnetic tape having an audio channel and a control channel, relay means controlled by said control channel, said relay means having contacts, and an energizing circuit connected to said driving motor means through said contacts.

14. The educational system of claim 13, and wherein said film strip includes a still frame carrying visual lesson material of the multiple-choice type.

15. The educational system of claim 1, and means to provide an audible beat at the student station concurrently with the movement of the visual musical notation lesson material, and wherein said register means comprises a plurality of registers, and means simultaneously operating two of said registers when the operation of said student-actuated means substantially coincides with said audible beat.

16. The educational system of claim 6, and means to provide an audible beat at the student station concurrently with the movement of the musical notation.

17. The educational system of claim 16, and wherein said register means comprises a plurality of registers respectively representing the scores for rhythm, note and time, and means simultaneously operating the rhythm and note registers when the operation of the switch device associated with a musical note whose programming spot is received by said photo-sensitive means substantially coincides with said audible beat.

18. The educational system of claim 17, and means operating the time register when the switch device associated with said musical note is operated for a time period corresponding to the indicated playing length of the musical note.

19. The educational system of claim 17, and wherein the musical notation includes a rest interval, and means operating the note register if no switch device is operated by the student during the rest interval.

20. The educational system of claim 19, and means preventing operation of any of the registers if a switch device is operated during the rest interval.

21. The educational system of claim 17, and wherein the musical notation includes tied notes, and means operating said note register to provide a score equal to the value of the tied notes if the corresponding switch device is maintained operated during the presentation of the tied notes.

* * * * *

UNITED STATES PATENT OFFICE
CERTIFICATE OF CORRECTION

Patent No. 3,823,637      Dated July 16, 1974

Inventor(s) KENNETH N. SCOTT, Deceased

It is certified that error appears in the above-identified patent and that said Letters Patent are hereby corrected as shown below:

Column 13, line 17, delete "means".

Column 13, line 18, after "switch" insert --means--.

Column 14, line 24, delete "Claim 6" and insert --Claim 1--.

Signed and sealed this 12th day of November 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,823,637        Dated July 16, 1974

Inventor(s)    Kenneth N. Scott, Deceased

It is certified that error appears in the above-identified patent and that said Letters Patent are hereby corrected as shown below:

Column 12, line 16, delete "on" and insert -- one --.

Column 13, line 17, delete "means".

Column 13, line 18, after "switch" insert -- means --.

Column 14, line 24, delete "Claim 6" and insert -- Claim 1 --.

This certificate supersedes Certificate of Correction issued Nov. 12, 1974.

Signed and sealed this 19th day of November 1974.

(SEAL)
Attest:

McCOY M. GIBSON JR.        C. MARSHALL DANN
Attesting Officer          Commissioner of Patents